March 22, 1949.　　　A. M. UNGER　　　2,464,906
INDEXING DEVICE FOR WELDING MACHINES
Filed March 31, 1947　　　2 Sheets-Sheet 1
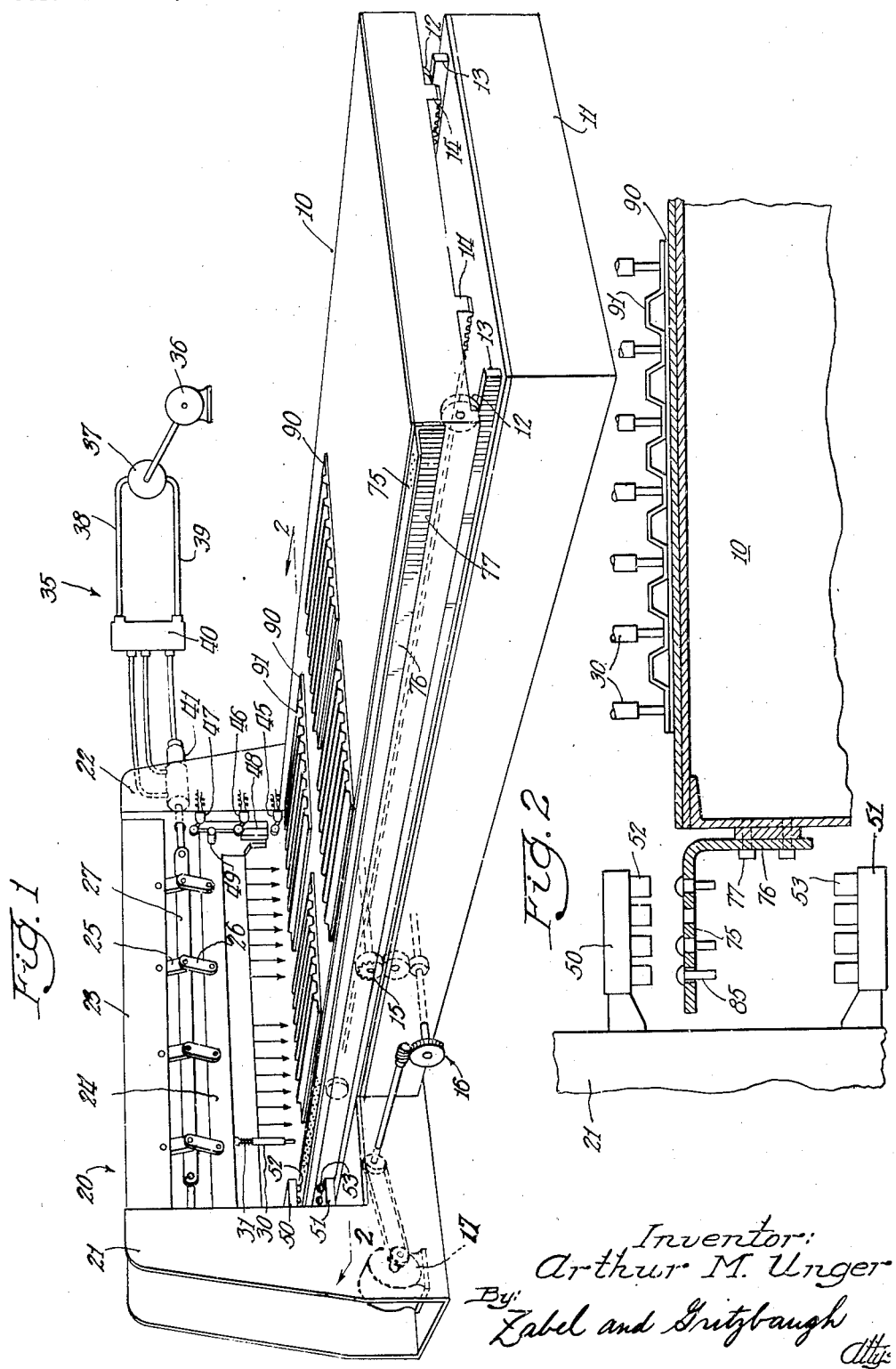
Inventor:
Arthur M. Unger
By: Zabel and Gritzbaugh
Attys March 22, 1949. A. M. UNGER 2,464,906
INDEXING DEVICE FOR WELDING MACHINES
Filed March 31, 1947 2 Sheets-Sheet 2
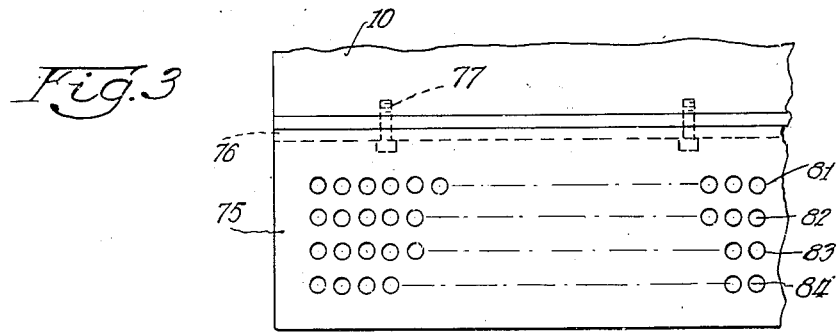
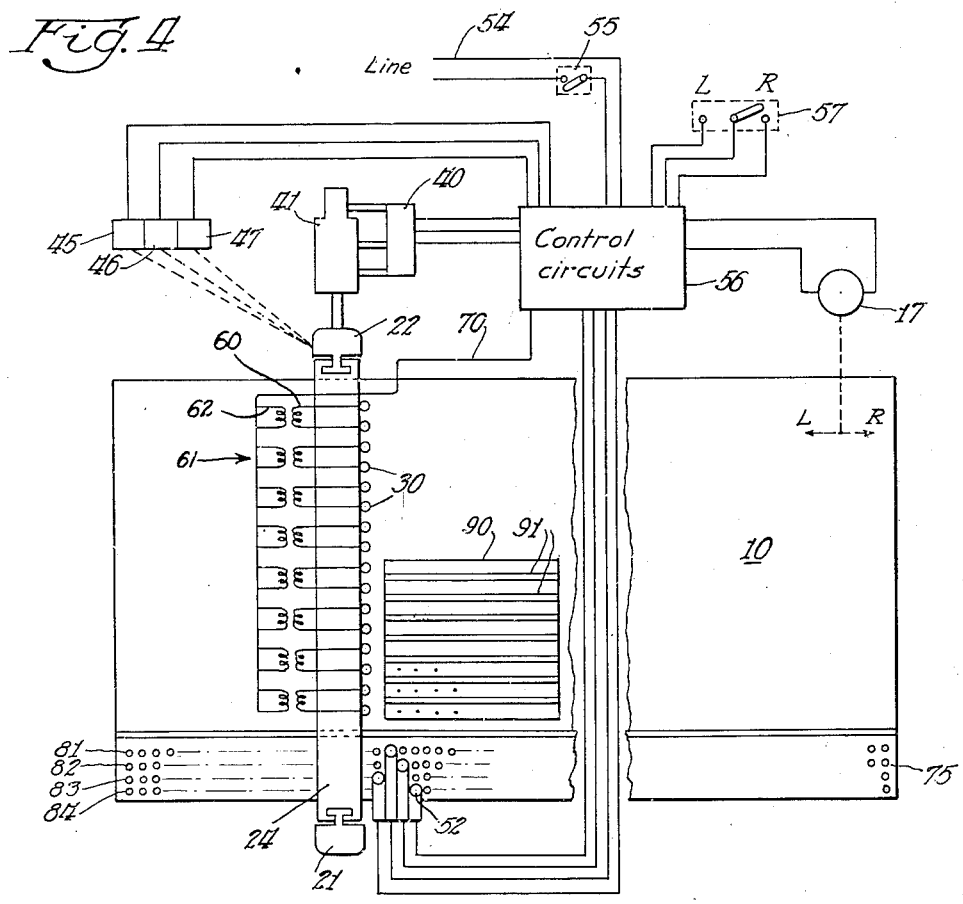
Inventor:
Arthur M. Unger
By: Zabel and Gritzbaugh
Attys.

Patented Mar. 22, 1949

2,464,906

UNITED STATES PATENT OFFICE 2,464,906

INDEXING DEVICE FOR WELDING MACHINES

Arthur M. Unger, Chicago, Ill., assignor to Pullman-Standard Car Manufacturing Company, Chicago, Ill., a corporation of Delaware Application March 31, 1947, Serial No. 738,469

6 Claims. (Cl. 219—4)

1

This invention relates to electric welding machines, and more particularly to an improved device for successively indexing the work holding table of such a machine to pre-determined welding positions and for otherwise controlling machine operation.

The principal object of the invention is to provide an indexing device of this character that has universal application, that is, a device capable of use with all welding problems to which the welding machine itself is suited. In brief, the invention eliminates the need for providing a separate indexing device for each work problem, and thus eliminates the expense of constructing a plurality of such devices. It also eliminates a storage problem such as would be occasioned by the use of a large number of individual indexing devices.

For a better understanding of the importance of the invention, a welding machine and the nature of the work with which the machine is normally used will be described hereinafter.

By way of general introduction, the welding machine with which the invention is used has a large work holding table that is mounted for longitudinal movement on a fixed base. A transverse row of spaced welding electrodes is disposed above the table centrally of the base. The table is adapted for movement to successive pre-determined positions (called index points) with respect to the electrodes, at which positions the electrodes descend upon the work and accomplish the desired welding. The present invention concerns itself with an improved device that co-operates with the machine and controls its operations.

Other objects and advantages and the nature of the invention will become apparent as the description proceeds, reference being had to the accompanying drawings wherein a preferred form of the invention is shown. It is to be understood that the description and drawings are illustrative only, and are not to be taken as limiting the invention except insofar as it is limited by the claims.

In the drawings:

Fig. 1 is a perspective view, shown somewhat diagrammatically, of a welding machine embodying the invention;

Fig. 2 is a fragmentary sectional view generally on line 2—2 of Fig. 1;

Fig. 3 is a fragmentary plane view of the improved indexing device, and

Fig. 4 is a diagrammatic view of the basic components of the welding machine showing the relationship of the invention thereto.

As shown in Fig. 1, the welding machine herein has a large work holding table 10. The top of the table may be covered with a continuous metal plate so that a durable work holding surface is provided, the surface lying in a flat plane.

2

The table top may also function as a conductor in the electrode circuit system.

Table 10 is slidably mounted for longitudinal movement on a base 11 by means of a plurality of rollers 12 which ride on spaced rails 13. Racks 14 depend from table 10 into engagement with co-operating gear wheels 15 which are driven through a suitable power train 16 by a table motor 17.

Midway along the length of base 11 a superstructure 20 is provided, the superstructure including side uprights 21 and 22. A transverse member 23 extends between the tops of uprights 21 and 22 and is rigidly connected thereto. Below transverse member 23 is disposed a transverse beam 24, the ends of beam 24 being in vertically slidable engagement with uprights 21 and 22. A plurality of links 25 and 26 have one end thereof pivoted respectively to transverse member 23 and beam 24, the other ends of the links being pivoted together in the well-known manner to provide a toggle arrangement. A toggle actuating element 27 forms a mechanical connection between the various common pivot points of the respective sets of links 25 and 26. As will be understood, transverse movement of actuating element 27 effects vertical motion of beam 24.

The beam 24 carries a plurality of spaced vertically disposed welding electrodes 30, each electrode being provided with a spring 31 that is capable of maintaining downward pressure on the electrode tip when the electrodes are brought in contact with the work, as more fully described hereinafter.

Toggle actuating element 27 may be transversely moved in any suitable manner such as by a hydraulic system generally shown at 35. Such a system has a motor 36 and associated pump 37, the pipes 38 and 39 from the pump leading to a solenoid valve assembly 40.

The valve assembly 40 is operatively connected to a cylinder 41, the cylinder containing two aligned pistons (not shown), a main piston for actuating element 27 and a secondary piston that is movable to permit an extended or "retracted" stroke by the main piston. Thus, the main piston is capable of strokes of two lengths. First, it has a stroke from one extreme position (where beam 26 is in its lowermost position and electrodes 30 are in contact with the work) to a "normal" position where the electrodes 30 are raised a short distance above the work. Second, it has a stroke from the same extreme position to a retracted position where the electrodes are raised to an uppermost height so that the electrodes may clear obstacles present on the work table.

Side upright 22 carries a lower limit switch 45, a normal limit switch 46 and a retracted limit switch 47, the first named two being actuated by a plate 48 carried by movable beam 24 and the latter being actuated by a pin 49 on beam 24. The function of these limit switches and associated actuating elements will be discussed hereinafter.

Side upright 21 carries a pair of spaced plates, an upper plate 50 and a lower plate 51, the two plates extending from upright 21 toward table 10. Referring to Fig. 2, upper plate 50 carries a plurality of (four in the example shown) photo-electric means 52, while lower plate 51 carries a like number of cooperating aligned illumination sources 53. The respective photo-electric means-illumination source combinations are connected in circuits that control the operating cycles of the welding machine in a manner hereinafter described.

Referring now to Fig. 4, the essential electrical and mechanical components of the above described welding machine are shown in somewhat simplified form. Electric power is led from the line 54 through a starting switch 55 to the various control circuits diagrammatically shown at 56. Connected to control circuits 56 is a left-right switch 57 that is suitably pre-set to determine the left or right movement of table 10. The table motor 17 is operatively connected to control circuits 56 so as to be responsive to the position of left-right switch 57.

The photo-electric means 52, illuminating sources 53, solenoid valve 40 and limit switches 45, 46, and 47 are all suitably connected to control circuits 56 as diagrammatically shown in Fig. 4. Electrodes 30 are series connected in pairs to the secondary 60 of respective transformers 61, the primaries 62 of the transformers being connected to control circuits 56 by means of conductors 70.

The indexing device of the present invention comprises a template associated with table 10 and extending substantially throughout its length, the template being disposed between the spaced plates 50 and 51 carried by side upright 21. As best shown in Figs. 2 and 3, the template may take the form of an angle member having leg 75 lying between plates 50 and 51, and leg 76 fixed to the side of table 10 in any suitable manner as by bolts 77. Leg 75 forms the effective portion of the indexing devices, and this portion together with its function in connection with the welding machine will now be described.

The leg 75, hereinafter called the template, is perforated with a plurality of spaced longitudinal rows of spaced holes, the rows shown being numbered 81, 82, 83 and 84 (Fig. 3). For convenience, the rows will be referred to as rows 1, 2, 3 and 4, respectively. In practice, the holes may be about a quarter of an inch in diameter, and along a longitudinal row they may be spaced on three-eighth inch centers, thus to provide for a sufficiently large number of index points. The transverse spacing between rows, of course, is determined by the transverse spacing of photo-electric means 52, each row of holes lying on a line between a photo-electric means and its associated illumination source.

Means are provided in connection with the template for separately closing and opening the holes to the passage of light. Any suitable means may be used, but I have found it convenient to employ simple rivets such as shown at 85 in Fig. 2. In that figure it will be noted that rivets 85 are shown in the illustrated holes of rows 1, 3 and 4, but that no rivet is shown in the hole of row 2. Thus light is permitted to pass from illumination source 53 through the open hole in row 2 to the aligned photo-electric means 52. This passage of light excites the photo-electric means and controls certain steps in the cycle of the welding machine, as will be hereinafter described.

Holes lying in rows 1 and 2 of the template effect the stopping of table motor 17 when the motor has moved the table to a pre-determined index point as established by the absence of a rivet in the hole corresponding to the index point. The holes in row 1 (it will be assumed) are effective to stop the motor when table 10 is moving to the right (looking at Figs. 1, 3 and 4). Row 2 is effective to stop table motor 17 when table 10 is moving to the left.

It might be noted that table momentum prevents an abrupt halt in the table movement, and that coasting thus occurs when the circuit associated with either row 1 or row 2 deenergizes table motor 17. This coasting may be compensated for either by having the position of plates 50 and 51 staggered with respect to the plane of the welding electrodes 30, or, if the plates and the electrodes are in alignment, by taking this coasting into account when removing rivets from the template.

Holes lying in rows 3 and 4 respectively cooperate with rows 1 and 2, that is, the holes in row 3 are effective when table 10 is moving to the right, and the holes in row 4 are effective when the table is moving to the left. The holes in rows 3 and 4 are opened to the passage of light to actuate circuits which permit the hydraulic system 35 to go to its retracted position, thus to raise electrodes 30 to their uppermost height so as to clear obstacles present on the table.

Prior to the actual operation of the welding machine described above, the work to be welded is carefully arranged on table 10. As an example of the work to which this machine is particularly well adapted, I have shown a plurality of side sheets or sheathing 90 in place upon the table. These side sheets may form the external side surfaces of railroad cars. When used for this purpose it is necessary to re-enforce these sheets, and to this end corrugated stiffeners as shown at 91 are used. The spot welding process has been found to be particularly desirable for rigidly associating the corrugated stiffeners 91 to the side sheets 90, a welded joint being provided at spaced intervals along each trough of a corrugated stiffener.

The present welding machine with its plurality of electrodes is adapted to simultaneously provide a welded joint in each trough along a transverse line across the stiffener. At the conclusion of one transverse line of welding, the electrodes are raised from the work and table 10 then moves to bring the work to the following index point for the next transverse line of welding. Thus it can be seen that by the use of this machine a complete railroad car side can have its side sheets and corrugated stiffeners welded together in a rapid and efficient manner. The operating cycle of the welding machine and its cooperation with the indexing device will now be described.

Assuming that the work has been carefully arranged on table 10, the template of the indexing device is set to control machine operation in accordance with the requirements of the work. To this end, the operator removes rivets 85 from rows 1 and 2 so that table 10 will stop at the proper pre-determined index points for the application of welds to the work. It will be remembered that row 1 controls table movement to the right, while row 2 controls table movement to the left. Where a large number of railroad cars of the same type are being made, it is desirable to set the template for both directions of table movement so that machine operation may be substantially continuous, interruptions occurring only when the table reaches its limits of movement so that the completed work may be removed and new work added. In the event the work has so-called obstacles thereon that may not pass under the electrodes when the electrodes are at normal height, rivets are removed from rows 3 and 4 at the appropriate places to cause the electrodes to raise to their retracted height, thus to clear the obstacles.

When the work has been arranged on the table and the template set for desired machine operation, the switch 57 should be set to its left or right position depending upon the first direction of table travel desired. Thereafter starting switch 55 is actuated and, assuming table 10 is not then at an index point, motor 17 is energized to start table movement in the direction determined by switch 57. Assuming the table is moving to the left, movement continues until an open hole in row 2 admits the passage of light from illuminating source 53 to corresponding photo-electric means 52. The circuit associated with this photo-electric means deenergizes table motor 17, although, as mentioned, the table coasts a distance beyond this point to the precise index point desired. Electrodes 30 are disposed above the work either at their normal or retracted height.

The motor stopping circuit actuates a first valve in the solenoid valve assembly 40 of the hydraulic system to send the main piston in cylinder 41 to an extreme position in one direction whereby the toggle mechanism lowers electrodes 30 into contact with the work. Springs 31 on the individual electrodes maintain suitable pressure between the electrodes and the work.

When the electrodes 30 reach their work contacting position, plate 48 carried on beam 24 actuates lower limit switch 45 to establish a circuit which energizes electrodes 30. A time delay relay device (not shown) automatically deenergizes this circuit after a pre-determined time to remove the current from the electrodes. The time delay relay may also provide for a short hold time after the circuit has been broken so that the work may cool under pressure.

This time delay relay then energizes a circuit to actuate a second valve in solenoid valve assembly 40 so that the piston returns to its normal position and thus raises electrodes 30 to their normal height above the work. At this point, the top of plate 48 actuates normal limit switch 46 to energize a circuit that starts table motor 17 which then moves table 10 to the left until the next open hole in row 2 admits light to photoelectric means 52. Thus successive cycles of machine operation occur over the limit of left direction travel of table 10.

A variation in the above described cycle occurs when obstacles are present on the work and it is desired to raise electrodes 30 to their retracted height to clear such obstacles. The position of such obstacles is, of course, accounted for in the setting of the holes in rows 3 and 4, row 4 being effective when table 10 is moving to the left. Assuming there is an obstacle between the present index point and the following index point, the hole in row 4 in alignment with its associated photo-electric means at the present index point is left open to permit the passage of light. The excited photo-electric means actuates a circuit which renders the normal limit switch 46 inoperative.

This circuit also actuates a third valve of the solenoid valve assembly 40 which retracts the secondary piston in cylinder 41. This has the effect of permitting an increased stroke of the main piston whereby the electrodes are raised to their retracted height. At this point retracted limit switch 47 is actuated by pin 49 to start table motor 17, and table motion continues until table 10 is moved to the next index point. When the light through the open hole in row 4 is cut off (by table motion) from cooperating photo-electric means 52, the circuit associated therewith actuates the third valve of solenoid valve assembly 40 to return the secondary piston to its normal position.

A suitable automatic switch (not shown) may be employed to effect a final stop when table 10 arrives at its extreme limit of travel in either direction. As mentioned, at the end of table travel in one direction the work may be removed from the table and replaced with new work. Thereupon the machine will respond to the settings of the other two rows of holes in the indexing device and will go through the predetermined cycles with the table moving in the opposite direction.

Thus it will be seen that the indexing device of the present invention greatly enhances the usefulness of a welding machine of this character, and it eliminates the expense of constructing separate templates for each particular welding job. Since such a machine would normally be used for a large number of different jobs, it can be seen that the construction of a separate template for each job and the matter of storing such templates for future use would be major problems. The present invention completely eliminates such problems through the use of a single permanently attached template which may easily be set by the operator for each particular job.

While four longitudinal rows of holes have been shown in template 75, useful results may be obtained by using only two rows. In this case the plates 50 and 51 that support the photo-electric means and illumination sources, respectively, would be slidably mounted so they could be adjusted back and forth to compensate for table coasting. Thus only two photo-electric means—illuminating source combinations need be provided.

From the above description it is thought that the construction and advantages of the invention will be readily apparent to those skilled in the art. Various changes and modifications may be made without departing from the spirit or losing the advantages of the invention.

Having thus described the invention, what I claim as new and desire to secure by Letters Patent is:

1. In a welding machine having the following: a table for holding work; means for moving said table to extreme positions in both longitudinal directions; a support disposed transversely above said table; spaced electrodes depending from said support; means for moving said electrodes selectively to positions (1) where said electrodes contact the work, (2) where said electrodes are disposed a normal height above said work, and (3) where said electrodes are disposed a retracted height above said work whereby said electrodes may clear obstacles on the moving table; and control circuits for actuating (1) said table moving means, (2) said support moving means, and (3) the current to said electrodes; said control circuits including illumination sources and aligned photo-electric means cooperating respectively with each source; the combination therewith of an indexing template associated with said table and extending the length thereof and disposed between said illumination sources and aligned, cooperating photo-electric means, said indexing template having four spaced rows of spaced holes therethrough, each row being in alignment with an illumination source photo-electric means, two of said rows being effective to control machine operation during table motion in one direction and the other two of said rows being effective during table motion in the opposite direction, and means associated with said holes selectively to block the passage of light therethrough and to admit the passage of light, the holes of one row of each set of two being opened to admit the passage of light at predetermined index points to stop table motion, the holes of the other row of each set being opened to admit the passage of light whereby the electrodes are raised to a retracted height above the work, thus to provide an indexing template suitable for use with a plurality of work problems.

2. In a welding machine having the following: a table for holding work; means for moving said table to extreme positions in both longitudinal directions; a support disposed transversely above said table; spaced electrodes depending from said support; means for moving said electrodes selectively to positions (1) where said electrodes contact the work, (2) where said electrodes are disposed a normal height above said work, and (3) where said electrodes are disposed a retracted height above said work whereby said electrodes may clear obstacles on the moving table; and control circuits for actuating (1) said table moving means, (2) said support moving means, and (3) the current to said electrodes; said control circuits including illumination sources and aligned photo-electric means cooperating respectively with each source; the combination therewith of an indexing template associated with said table and extending the length thereof and disposed between said illumination sources and aligned, cooperating photo-electric means, said indexing template having a longitudinal row of spaced holes therethrough in alignment with each source-means, and means associated with said holes selectively to block the passage of light therethrough and to admit the passage of light, said means being positioned to admit the passage of light through holes at predetermined index points along said table as required by particular work to effect machine operation in response to a particular setting of said indexing template, thus to provide an indexing template suitable for use with a plurality of work problems.

3. In a welding machine having the following: a work holding table; means for moving said table in a progressive manner; a support disposed transversely above said table; spaced electrodes depending from said support; means for moving said electrodes selectively to positions (1) where said electrodes contact the work and (2) where said electrodes are disposed above said work; and control circuits for actuating said table moving means and said electrode moving means; said control circuits including an illumination source and aligned photo-electric means; the combination therewith of an indexing template extending the length of said table and disposed between said illumination source and said photo-electric means, said indexing template having a longitudinal row of spaced holes in alignment with said source-means, and means associated with said holes selectively to block the passage of light therethrough and to admit the passage of light, said means being positioned to admit the passage of light through holes at pre-determined index points along said table to stop said table moving means, to lower the electrodes to the work, to energize and deenergize said electrodes, to raise said electrodes and to start said table moving means, thus to provide an indexing template suitable for use with a plurality of work problems.

4. In a welding machine having a movable work holding table, welding electrodes thereabove, means for progressively moving said table, means for controlling said table moving means, said controlling means including a circuit associated with said table moving means and having cooperating photo-electric means and an illumination source; an indexing template extending the length of said table and disposed between said photo-electric means and said illumination source, said template having a row of spaced holes throughout its length, means for closing said holes to the passage of light which on removal permit light to pass from said source to said photo-electric means and thus stop operation of said table moving means.

5. In a welding machine of the character described, a work holding table, means for progressively advancing said table to a plurality of predetermined index points, said means including an indexing template extending the length of said table, said template having spaced holes throughout its length, removable means for selectively closing the individual holes to the passage of light, and photo-electric means operatively associated with said holes and with said table advancing means whereby said table is stopped in response to open holes in said template.

6. In a welding machine of the character described, a work holding table, means for transversely advancing said table to a plurality of predetermined index points, said means including an indexing template substantially coextensive with the length of the table and having spaced lengthwise thereof light transparent portions that permit passage of light therethrough, removable means for selectively closing to the passage of light each of said light transparent portions, and photo-electric means operatively associated with said light transparent portions and with said table advancing means whereby said table is stopped in response to open light transparent portions in said template.

ARTHUR M. UNGER.

REFERENCES CITED

The following references are of record in the file of this patent:

UNITED STATES PATENTS

| Number | Name | Date |
|---|---|---|
| 2,079,042 | Saives | May 4, 1937 |
| 2,244,006 | Harrington | June 3, 1941 |
| 2,394,599 | Edelman et al. | Feb. 12, 1946 |